United States Patent
Fardig et al.

(10) Patent No.: US 12,555,379 B2
(45) Date of Patent: Feb. 17, 2026

(54) COMPUTER VISION TO DETERMINE WHEN VIDEO CONFERENCE PARTICIPANT IS OFF TASK

(71) Applicant: LENOVO (SINGAPORE) PTE. LTD., Singapore (SG)

(72) Inventors: Matthew Fardig, Morrisville, NC (US); Timothy Robbins, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 276 days.

(21) Appl. No.: 18/353,668

(22) Filed: Jul. 17, 2023

(65) Prior Publication Data

US 2025/0029385 A1    Jan. 23, 2025

(51) Int. Cl.
G06V 20/40    (2022.01)

(52) U.S. Cl.
CPC .............. *G06V 20/48* (2022.01); *G06V 20/41* (2022.01)

(58) Field of Classification Search
CPC ................................ G06V 20/48; G06V 20/41
See application file for complete search history.

(56) References Cited

U.S. PATENT DOCUMENTS

| | | | | |
|---|---|---|---|---|
| 9,741,257 B1 * | 8/2017 | Plain | .................... | H04L 65/1089 |
| 9,774,823 B1 * | 9/2017 | Gadnir | ................. | H04L 12/1827 |
| 10,917,487 B2 * | 2/2021 | Nishikawa | ........ | G06V 30/19013 |
| 11,146,601 B1 * | 10/2021 | Silverstein | .............. | H04L 67/10 |
| 12,051,045 B1 * | 7/2024 | Rachowin | ............. | G06F 3/0482 |
| 2005/0117053 A1 * | 6/2005 | Houmeau | ................. | H04N 9/12 345/1.3 |
| 2019/0342329 A1 * | 11/2019 | Turgeman | ............. | G06F 3/0488 |
| 2022/0207832 A1 * | 6/2022 | Yoo | ......................... | G06T 17/00 |

FOREIGN PATENT DOCUMENTS

| | | | | |
|---|---|---|---|---|
| WO | WO-2014065908 A1 * | 5/2014 | ............. | G06Q 10/10 |
| WO | WO-2021099808 A1 * | 5/2021 | ............. | G06F 21/31 |

\* cited by examiner

*Primary Examiner* — Duc Nguyen
*Assistant Examiner* — Saad Ahmed Syed
(74) *Attorney, Agent, or Firm* — John M. Rogitz; John L. Rogitz

(57) ABSTRACT

In one aspect, a device includes a processor assembly and storage accessible to the processor assembly. The storage includes instructions executable by the processor assembly to use one or more content recognition/computer vision algorithms to determine whether first and second images from respective client devices of first and second video conference participants indicate the first and second video conference participants being engaged in a same task. Based on a determination that the first and second images do not indicate the first and second video conference participants being engaged in the same task, the instructions are executable to present an electronic notification indicating that the first and second video conference participants are not engaged in the same task. For example, the electronic notification may be presented at one of the participants' devices and/or the device of a separate conference organizer.

20 Claims, 5 Drawing Sheets

COMPUTER VISION TO DETERMINE WHEN VIDEO CONFERENCE PARTICIPANT IS OFF TASK

FIELD

The disclosure below relates to technically inventive, non-routine solutions that are necessarily rooted in computer technology and that produce concrete technical improvements. In particular, the disclosure below relates to use of computer vision and other content recognition technologies to determine when a video conference participant is off task.

BACKGROUND

As recognized herein, remote learning through online video conferencing presents a unique set of issues that in-person learning does not. As further recognized herein, among these issues is that it is currently technologically difficult if not impossible to adequately track whether remote learning students are on track in performing a live class assignment. There are currently no adequate solutions to the foregoing computer-related, technological problem.

SUMMARY

Accordingly, in one aspect a first device includes a processor assembly and storage accessible to the processor assembly. The storage includes instructions executable by the processor assembly to access one or more first images of a first screen of a first video conference participant, and to access one or more second images of a second screen of a second video conference participant. The instructions are also executable to execute computer vision to analyze the one or more first images and the one or more second images to determine whether the one or more first images and the one or more second images indicate, to at least a threshold level of confidence, participant engagement in a same task. Based on a determination that the one or more first images and the one or more second images do not indicate participant engagement in the same task, the instructions are executable to present a notification at a second device. The notification indicates that the one or more first images and the one or more second images do not indicate participant engagement in the same task.

In various example implementations, the determination may involve one or more of whether the one or more first images and the one or more second images show the same text presented on each of the first and second screens, whether the one or more first images and the one or more second images show a same graphical object presented on each of the first and second screens, whether the one or more first images and the one or more second images show a same color scheme presented on each of the first and second screens, and/or whether the one or more first images and the one or more second images show a same shape presented on each of the first and second screens.

In certain specific example implementations, the instructions may also be executable to execute computer vision and topic analysis to analyze the one or more first images and the one or more second images to determine whether the one or more first images and the one or more second images indicate, to at least the threshold level of confidence, participant engagement in the same task.

Additionally, in some examples the first video conference participant and the second video conference participant may be engaging in a live video conference, and the one or more first images and the one or more second images may have been generated at different times of day. So here for example, based on a determination that the one or more first images and the one or more second images indicate participant engagement in the same task, the instructions may be executable to decline to present the notification at the second device and to also remove a status flag indicating that at least one of the first and second participants might not be engaging in the same task.

In various example implementations, the second device may be the same as or different from first device.

Also in various example implementations, the notification may include a graphical notification presented on a display of the second device, and/or an audible notification presented on a speaker of the second device. The second device may be a client device associated with one of the first and second video conference participants, and/or the second device may be a client device of an organizer of a video conference in which the first and second video conference participants are participating. If desired, the one or more first images and the one or more second images may be thumbnail images.

In another aspect, a method includes accessing one or more first images of a first screen of a first video conference participant and accessing one or more second images of a second screen of a second video conference participant. The method also includes executing computer vision to analyze the one or more first images and the one or more second images to determine whether the one or more first images and the one or more second images indicate, to at least a threshold level of confidence, participant engagement in a same task. Based on determining that the one or more first images and the one or more second images do not indicate participant engagement in the same task, the method includes presenting a notification at a second device. The notification indicates that the one or more first images and the one or more second images do not indicate participant engagement in the same task.

In various examples, the determination may involve whether the one or more first images and the one or more second images show the same text presented on each of the first and second screens, and/or whether the one or more first images and the one or more second images show a same graphical object presented on each of the first and second screens.

Also in various examples, the notification may include one or more of a notification to one of the first and second video conference participants warning that the respective participant to whom the notification is presented is not on task, and/or a notification to one of the first and second video conference participants instructing the respective participant to whom the notification is presented on steps to take to get back on task. Additionally or alternatively, the notification may include a notification to a video conference organizer that one of the first and second video conference participants is not currently engaged in the same task as the other one of the first and second video conference participants.

In still another aspect, at least one computer readable storage medium (CRSM) that is not a transitory signal includes instructions executable by a processor assembly to use one or more content recognition algorithms to determine whether first and second images from respective client devices of first and second video conference participants indicate the first and second video conference participants being engaged in a same task. Based on a determination that the first and second images from the respective client devices of the first and second video conference participants do not indicate the first and second video conference participants being engaged in the same task, the instructions are executable to present an electronic notification indicating that the first and second video conference participants are not engaged in the same task.

The details of present principles, both as to their structure and operation, can best be understood in reference to the accompanying drawings, in which like reference numerals refer to like parts, and in which:

DETAILED DESCRIPTION

Figure 1:
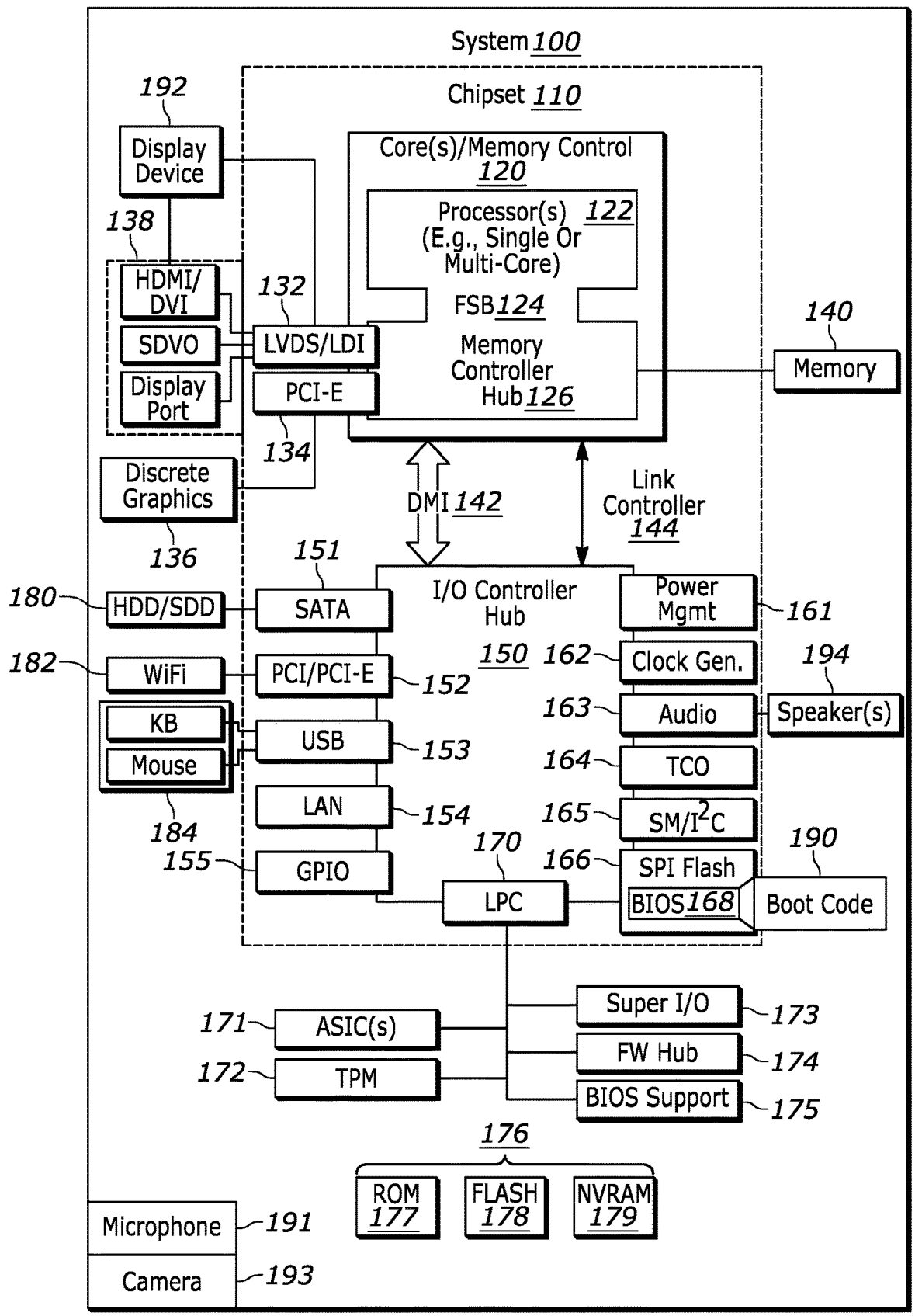
FIG. 1 is a block diagram of an example system consistent with present principles.

Consistent with present principles, classroom management software may be used to track student tasks. Thumbnails from student machines may be sent to the teacher, teacher's assistant, etc. The teacher's device may then analyze those thumbnails to see if the students are on task. For example, if thirty students are in the class and those students are supposed to be researching something via an online encyclopedia, the device would expect each student to have a thumbnail that shows that respective student's screen with has his/her browser open and on the relevant online encyclopedia web page. If the student has another application or window or website open as shown in the thumbnail, the device can notify the teacher. The classroom management software itself might be Lenovo's LanSchool Air, for example.

Thus, computer-vision technology may be used to analyze the student thumbnails in the classroom management software to verify if students are doing the same thing or not. The conferencing system may be designed to define outliers where one or more students appear to be doing something different from the group, and therefore are not on task.

Accordingly, in one example implementation, student thumbnails may be gathered and sent to a central location (e.g., a server, and/or the teacher's machine, etc.) by the classroom management software. As the thumbnails arrive, they are analyzed by computer-vision software to identify "key" characteristics such as text on the screen, dominant colors, known shapes such as rectangles at the top of a window (title bar), etc. Relationships among these elements may also be gathered. For example, the text of a certain word processing application ("app") exists in the color white within a blue rectangle title bar that sits above the text and says "Home, Insert Design, Layout", etc. The metadata gathered by computer-vision may thus be compared across the set of thumbnails for the class, and thumbnails that do not match (e.g., based on a pre-defined threshold) may be highlighted as outliers. So, for example, if a markedly different set of content were presented at one student's device, that student may be highlighted. But if a different version of the same word processing app is being presented on the screen of that student's device and the app presents the same content elements but located at different screen locations (e.g., bottom right rather than top left), the student may not be highlighted since the student is still engaging in the same task with the same app (just a different version). These same principles may also apply to instances where different participants are using different guest operating systems to run their local video conferencing software (e.g., some running Windows, some running Android, some running macOS).

Also per this example implementation, timestamps for each thumbnail may be retained. If an outlier is detected, that outlier image(s) may be compared to earlier thumbnails from other students to detect if the former is simply behind with his/her work compared to the other students. If the outlier images still do not match any of those earlier thumbnails from others, the student might instead be ahead of their peers and so their thumbnail state from the now earlier time of day may also be continually/periodically checked later against the latest thumbnails from others from later times of day to confirm the outlier student is simply ahead their peers (before the outlier student is otherwise confirmed as in fact an outlier).

As a use case, suppose Mr. Smith is teaching an assignment, using remote learning video conference software, about using a spreadsheet app to create a basic graph using a built-in wizard in the spreadsheet app. Mr. Smith has supplied a test file for his thirty students called "Unit 1 Graph Tutorial.xls". Mr. Smith asks the students to open their own copy of the spreadsheet app and then begins to walk the students through the assignment.

During this process, the video conferencing software may be gathering student thumbnails every ten seconds, and does not necessarily even have to present the thumbnails to Mr. Smith. The remote learning video conferencing software may then use computer-vision to determine that twenty-eight students have a window open with a green rectangle title bar. In that green rectangle is white text reading "Unit 1 Graph Tutorial.xls" (demonstrating that the students have the correct workbook open). Computer-vision also determines that a row of text containing A, B, C, D, E, etc. sits above a grid of white rectangles. But the software also determines that two other students do not have this sort of metadata/content on their respective screens. The software therefore notifies Mr. Smith that the two students are off task, and Mr. Smith is able to quickly help them and get back to teaching.

As for possible implementations/variations, first note that present principles may be used to provide both autonomous help to students or autonomous warnings to students that are off track.

Additionally, teachers may be notified when students appear to be off track. As the Computer Vision detects an outlier, that student could enter an alert status where he/she is monitored more frequently until the person is either determined to be back on track or worthy of notification to the teacher.

What's more, as different students might be using different operating systems and/or different application layouts, the active window/tab (as determined or identified with Computer Vision) may be a factor in outlier detection. This could serve to strengthen confidence that students are in fact on track despite somewhat different content layouts for their screens. For example, if the active windows of different student devices and/or the active tabs of the open app/browser they are using is the same as others, and/or has the same title as others (e.g., same title in the active tab of a file browser or Internet browser), the respective students themselves may be determined to be on track despite their respective screens not mirroring each other precisely. Thus, a confidence score/threshold may be used here to fine tune what is considered "the same" when comparing disparate screens/content layouts. That threshold might be a seventy percent content match, for example.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used, as may a Chrome or Android or Windows or macOS operating system. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided, and that is not a transitory, propagating signal and/or a signal per se. For instance, the non-transitory device may be or include a hard disk drive, solid state drive, or CD ROM. Flash drives may also be used for storing the instructions. Additionally, the software code instructions may also be downloaded over the Internet (e.g., as part of an application ("app") or software file). Accordingly, it is to be understood that although a software application for undertaking present principles may be vended with a device such as the system 100 described below, such an application may also be downloaded from a server to a device over a network such as the Internet. An application can also run on a server and associated presentations may be displayed through a browser (and/or through a dedicated companion app) on a client device in communication with the server.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 includes a processor assembly 122 (e.g., one or more single core or multi-core processors, etc.) and a memory controller hub 126 that exchange information via a front side bus (FSB) 124. A processor assembly such as the assembly 122 may therefore include one or more processors acting independently or in concert with each other to execute an algorithm, whether those processors are in one device or more than one device. Additionally, as described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one or more GPUs). An example system may include AGP or PCI-E for support of graphics.

In examples in which it is used, the I/O controller hub 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 and/or PCI-E interface 152 provide for reading, writing or reading and writing information on one or more drives 180 such as HDDs, SSDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone to the processor 122 based on audio that is detected, such as via a user providing audible input to the microphone as part of a video conference consistent with present principles. The system 100 may also include a camera 193 that gathers one or more images and provides the images and related input to the processor 122. The camera may be a digital camera (e.g., with a single image sensor), a three-hundred sixty (360) degree camera with multiple image sensors, a thermal imaging camera, an infrared (IR) camera, a webcam, a three-dimensional (3D) camera, and/or another type of camera otherwise integrated into the system 100 and controllable by the processor 122 to gather still images (e.g., thumbnails) and/or video during a video conference consistent with present principles.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
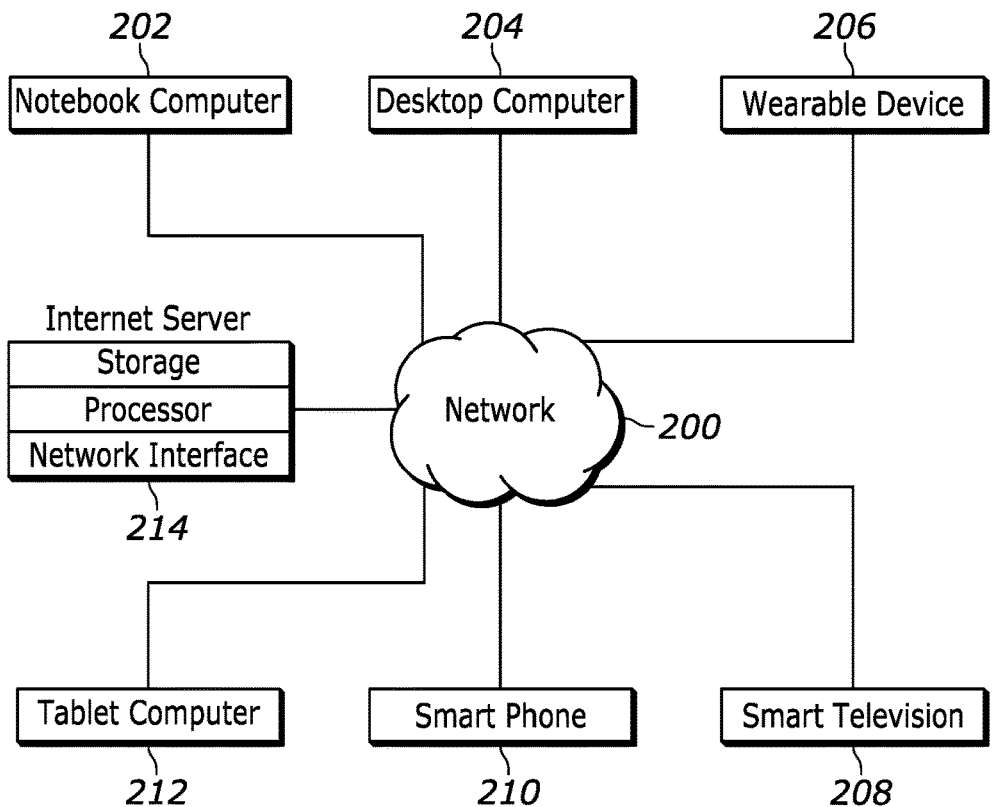
FIG. 2 is a block diagram of an example network of devices consistent with present principles.

Turning now to FIG. 2, example devices are shown communicating over a network 200 such as the Internet to facilitate a video conference consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch or smart glasses, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
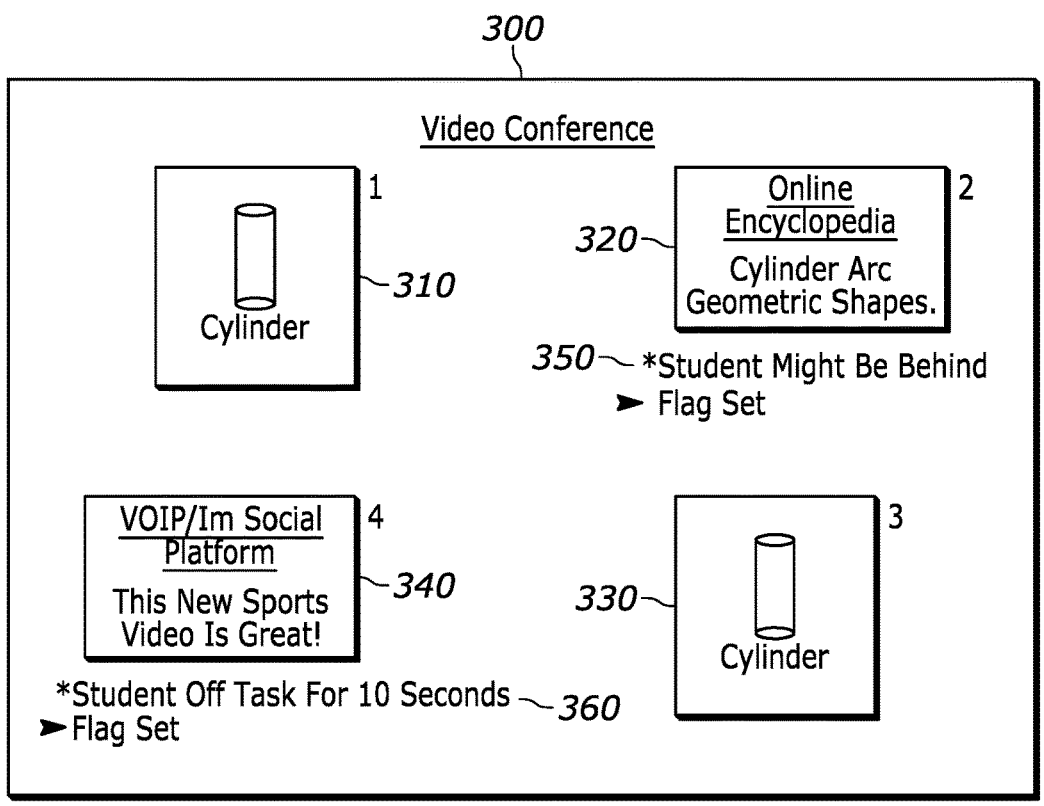
FIGS. 3 and 4 show various example graphical user interfaces (GUIs) that may be presented on a video conference organizer's client device display during a video conference consistent with present principles.

Now in reference to FIG. 3, suppose four students are participating in a remote learning video conference along with a teacher. The graphical user interface (GUI) 300 of FIG. 3 may therefore be presented on the display of the teacher's client device, whether that be a laptop computer, desktop computer, headset, smartphone, or other device. As shown in FIG. 3, the GUI 300 may include live, real-time video feeds 310, 320, 330, and 340 of the respective screens of each student's device (e.g., as provided through the video conferencing software's screen sharing functionality). Thus, the screens for the feeds 310-340 may be the respective current (and full) display presentations/display outputs of the respective displays of each student's own client device as used on their end for both video conferencing and task following.

As may also be appreciated from FIG. 3, the students are engaging in a lesson on the geometric figure of a cylinder. Screens 310 and 330 show the same content being presented at those respective student devices. Additionally, while screen 320 shows different content than the screens 310, 330 (an online encyclopedia entry for "cylinders"), consistent with present principles the conferencing system has recognized the text presented on the screen 320 using optical character recognition (OCR) (an example form of computer vision) and determined through topic analysis on the text of the OCR result that the screen 320 is still presenting content related to the same topic/subject (cylinders). And note here that the conferencing system itself may be hosted at a remotely-located coordinating server per this example.

Based on this determination, no notifications may be presented concerning the student associated with the screen 320 at either the teacher's device or the device of the student himself/herself. However, in other examples the system might determine that since the content is different but still pertains to the same topic/subject, the student might be behind or ahead of the other students associated with the screens 310, 330 and therefore set a status flag in response. The status flag might be, for example, a back-end system reminder to check back on the student at more-frequent intervals to determine if the student is on task or not (based on whether the screen 320 shows the same content as the majority or a plurality of other students' screens). The status flag might additionally or alternatively be a visual flag 350 establishing a visual warning notification to the teacher that the student is determined to potentially behind (or ahead) but still potentially on task.

FIG. 3 also shows that another student associated with screen 340 is not viewing content about cylinders at all but is instead participating in text chatting on a Voice over Internet Protocol (VOIP)/instant messaging social platform, discussing the topic of sports instead. The coordinating server might therefore execute computer vision on the associated real-time video stream or a thumbnail subset of screen images to determine that the screen 340 is not presenting the same content or even different content but on the same subject as a plurality/majority of the other screens 310-330. For example, computer vision might be executed to determine that the screen 340 does not show the same text, same non-text graphical objects, same color scheme, and/or same shapes as a plurality or majority of other screens that are participating in the video conference.

As such, another notification 360 might be presented on the teacher's GUI 300. This notification 360 may indicate via a text-based warning that the student associated with the screen 340 is off task compared to the computer vision results for the other screens 310-330. The notification 360 may even include an amount of time that the respective student has been off task as determined from the screen 340, which in the present example is ten seconds. The notification 360 may be presented responsive to a first threshold amount of time (e.g., thirty seconds) expiring as measured from when the student is initially determined as potentially off task.

As also shown in FIG. 3, the notification 360 may also indicates that a flag has been set for the respective student so that the respective student's screen 340 may be monitored at more frequent intervals than the other students, at least until the respective off-task student is determined to be back on task. Then, if that student is still not determined to be on task for at least a second, longer threshold amount of time (e.g., as still measured from when the student was initially determined to be off task), the teacher may be notified via additional notifications per FIG. 4. However, further note that in other embodiments, a flag need not necessarily be set and instead certain notifications and selectors as shown in FIG. 4 may be presented responsive to the first threshold amount of time expiring instead.

Figure 4:
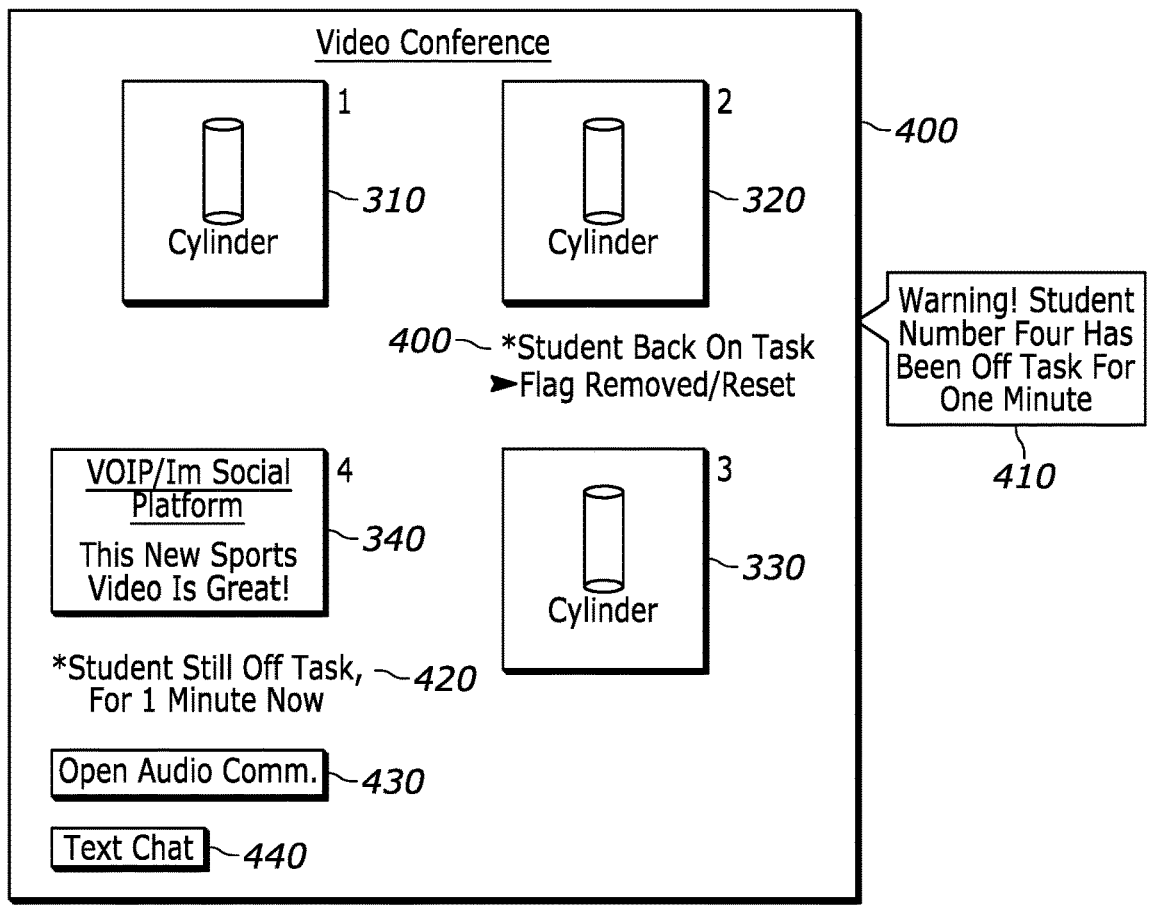

In either case, reference is now made to the GUI 400 of FIG. 4. The GUI 499 may be established by the GUI 300 of FIG. 3 but with certain aspects dynamically changed based on determinations of students being on task or off task.

As such, the GUI 400 again presents the real-time video feeds 310-340 (or intermittent thumbnail samples) for each student's screen. Also note that the student associated with screen 320 has been determined to be back on task since the screen 320 is now presenting the same content as the screens 310, 330. As such, a notification 400 may be presented underneath the screen 320 that indicates via text that the student is back on task and that the flag for more frequent monitoring has been removed.

However, because the student associated with the screen 340 is determined to be off task (e.g., off task for the first threshold amount of time, or still off task for the second threshold amount of time), an audible notification 410 may be presented via at least one speaker on the teacher's client device, and also an additional graphical notification 420 may be presented via the teacher's display. Here the audible notification 410 is illustrated as a speech bubble. The notification 410 itself may be presented using a digital assistant and speech-to-text software to audibly speak, in a computerized voice, a message such as "Warning! Student number four has been off task for one minute." This may draw the teacher's attention to that student being off task.

Also to draw the teacher's attention to that student, the graphical notification 420 may be presented in the form of a star icon and text-based warning, with the text warning indicating a message with the amount of time the student has been off task. Thus, in the present example the message indicates "Student still off task, for one minute now".

The notification 420 may be accompanied by selectors 430, 440. These selectors may be selectable via touch, cursor, or other input for the teacher to directly address the relevant student without addressing the other video conference participants at large. As such, selector 430 may be selected to open a direct audio communication channel with the relevant student (e.g., a side audio channel over the same network) so that the teacher and relevant student can audibly converse back and forth using their respective client device microphones and speakers without their audio feeds being presented to other conference participants as part of the video conference. Selector 440 may additionally or alternatively be selected to open a text chat channel between the teacher and relevant student so that the two of them can text chat back and forth without the text chat being presented to other conference participants as part of the video conference. Accordingly, through either or both of the selectors 430, 440, the teacher and off-task student may converse so that the teacher may remind the student to pay attention, so that the teacher may help the student resolve any confusion with the class lesson on cylinders, so that the teacher may help the student navigate to a different screen to get back on task, etc.

Figure 5:
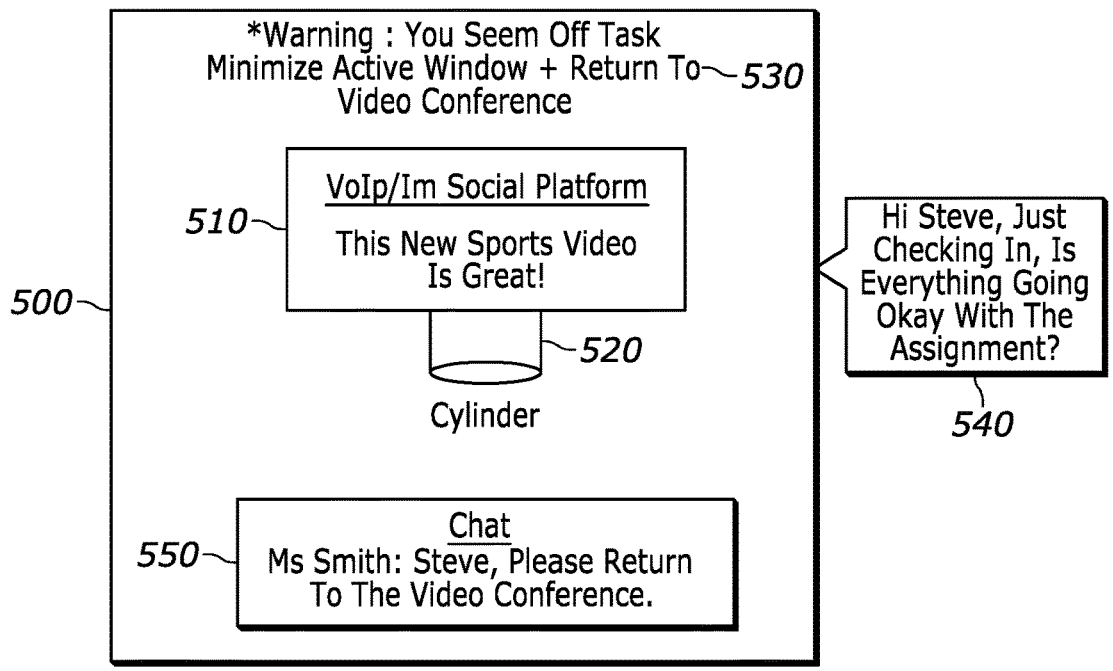
FIG. 5 shows an example GUI that may be presented on the client device display of one of the other video conference's participants consistent with present principles.

Before moving on to the description of FIG. 5, further note with respect to FIG. 4 that should the student associated with screen 320 be determined to be off task responsive to the second threshold amount of time ending (even if initially determined to just be behind as described in reference to FIG. 3), then a notification and selectors similar to the notification 420/selectors 430, 440 might be presented underneath the screen 320 for the teacher to converse with that student as well.

FIG. 5 shows another example GUI 500. But here, the GUI 500 may be presented on a respective student's display responsive to a determination that the student is off task (e.g., for the second threshold amount of time mentioned above). In the present instance, FIG. 5 continues with the same example as FIGS. 3 and 4 and, as such, the GUI 500 is understood to be presented on the display of the student associated with feed 340 (the one engaging in VoIP call and/or text chatting about sports rather than engaging in remote learning about cylinders according to the teacher's lesson plan on cylinders).

Accordingly, the same VOIP platform/app overlay 510 that was shown in FIGS. 3 and 4 is also shown in FIG. 5. It is further noted in some examples, part of the same content 520 as shown on the screens 310, 330 might still be presented underneath the overlay 510 but is partially obstructed by the overlay 510. It is to therefore be understood that in some examples, a screen might be determined to show a student off task if it does not show more than a threshold amount of the same content as other screens (such as at least seventy five percent). This helps account for differences in scroll positions, scaling, etc. for the same content without making an off-task determination, while also still flagging overlays like the overlay 510 that indicate the student is off task.

Regardless, based on a determination that the relevant student is off task, the GUI 500 may present a graphical notification 530 to that student to remind the student to stay on task. In the present example, the notification includes a non-text graphical element (e.g., icon) as well as a text warning indicating the following: "Warning: You seem off task . . . "

The notification 530 may also include text instructing the respective student to whom the notification 530 is presented on steps to take to get back on task (in the present example, " . . . minimize active window and return to the video conference"). Particular steps might be determined for presentation using a rules-based algorithm for different situations that might arise, might be determined dynamically using an artificial intelligence-based machine learning model, and/or might simply be a predetermined static message, depending on implementation.

As also shown in FIG. 5, an audible notification 540 may also be presented at the respective student's client device, as illustrated by the speech bubble shown. The audible notification 540 might be a computer-generated voice notification reminding the student to stay on task, such as a computer-generated voice speaking the text of the notification 530 using a text-to-speech algorithm. However, in the present example the audible notification 540 additionally or alternatively includes the teacher speaking to the student over a side audio channel as discussed above. As such, here the notification 540 audibly indicates "Hi Steve, just checking in. Is everything going okay with the assignment?". The relevant student (Steve) might then audibly respond, which Steve's microphone would pick up and transmit back to the teacher's client device (e.g., without Steve doing anything further, like consenting to the side channel or otherwise authorizing the side communication that is not presented to the video conference at large).

FIG. 5 also shows that the GUI 500 may include a text chat window 550. The text chat window 550 may include a text message/email sent from the teacher (e.g., based on selection of the selector 440 discussed above). Here, the text message from the teacher indicates, "Steve, please return to the video conference." Steve may also respond by entering additional text into the text chat window 550 using a text entry field and hard/soft keyboard and then sending that text back to the teacher.

Figure 6:
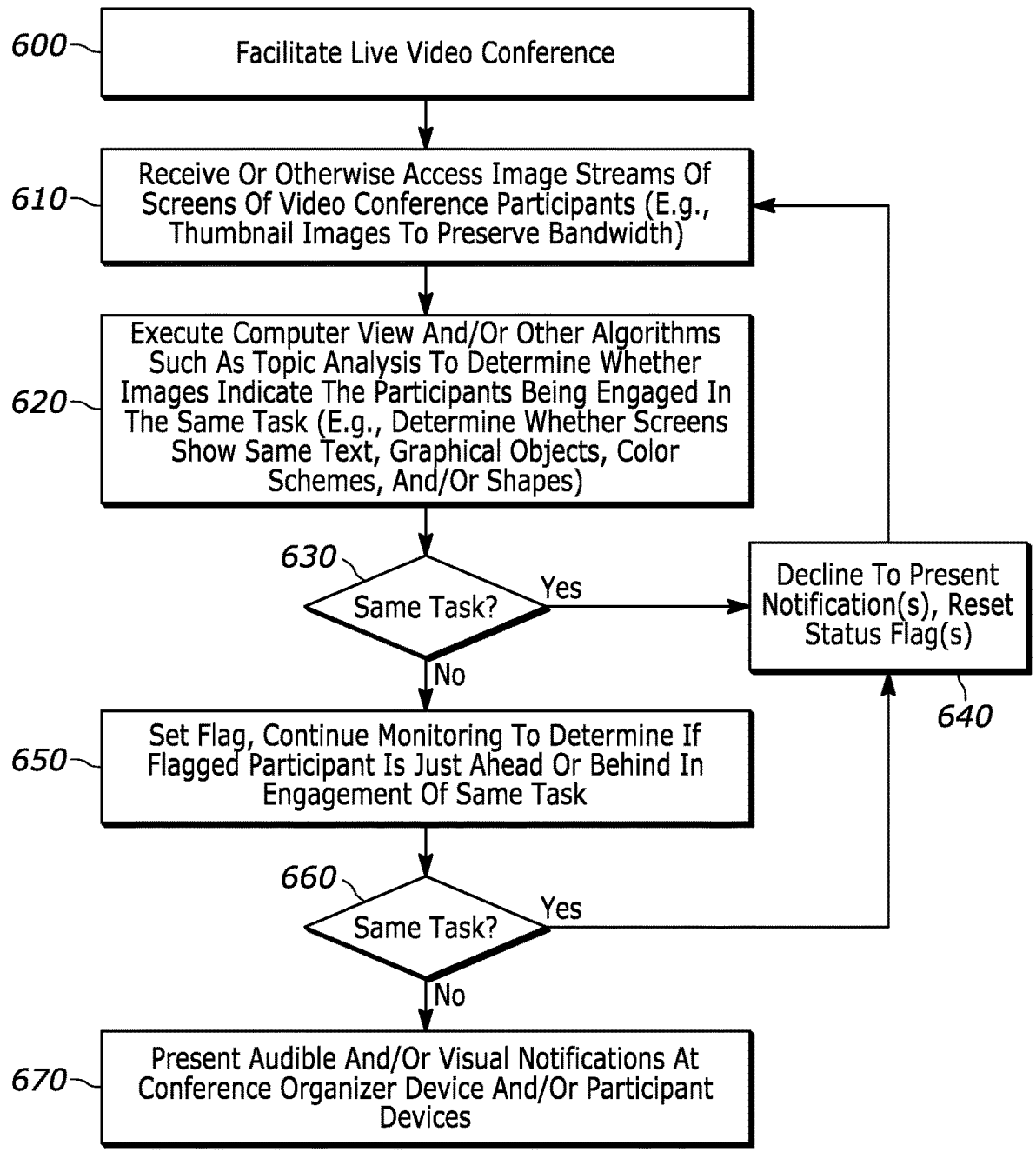
FIG. 6 illustrates example logic in example flow chart format that may be executed by one or more devices consistent with present principles.

Referring now to FIG. 6, example logic is shown that may be executed by a processor assembly of one or more devices, such as a video conferencing server and/or client device, in any appropriate combination consistent with present principles. For example, various steps in the logic of FIG. 6 may be executed by a teacher/instructor's client device and/or a remotely-located host server in any appropriate combination. Note that while the logic of FIG. 6 is shown in flow chart format, other suitable logic may also be used.

Beginning at block 600, the device may facilitate a live video conference consistent with present principles. This may include, if the device of FIG. 6 includes a client device, streaming a local video feed from a local camera, and streaming a local audio feed from a local microphone, to other client devices while also receiving other audio video streams from those other devices for local presentation. This might also include, if the device of FIG. 6 includes a server, routing audio video streams from each participant's client device to the client devices of the other participants so that the participants can see live real time video and hear live real time audio of each other. From block 600 the logic may then proceed to block 610.

At block 610 the device may receive or otherwise access images/streams of the screens of each conference participant. For example, high-definition video at a frame rate of 60 Hz may be received, or images at a slower frame rate might be received (such as one image per second). Either way, if desired the received images may be thumbnail images to help preserve bandwidth across the network by minimizing image data that is transmitted. In any case, at block 610 the device may thus access at least one or more first images of a first screen of a first video conference participant and one or more second images of a second screen of a second video conference participant.

From block 610 the logic may then proceed to block 620. At block 620 the device may execute computer vision and/or other algorithms (e.g., topic analysis) to analyze the one or more first images and the one or more second images to determine whether the one or more first images and the one or more second images indicate, to at least a threshold level of confidence, participant engagement in a same task. The same task might be completing a certain writing assignment, learning about a same subject, performing a same interactive learning session by going through a progression of screens, etc. The threshold level of confidence may be less than one hundred percent to account for screen layout differences, scroll position differences, formatting differences, etc., but still sufficient to return a determination of the same or related content is being presented on each screen. As such, the threshold level of confidence might be between seventy and ninety percent, for example.

Accordingly, in one example OCR might be executed on the images to run a comparison and determine whether the one or more first images and the one or more second images show the same text as being presented on each of the first and second screens (e.g., even if presented at different X-Y screen locations). In addition to or in lieu of that, OCR might still be executed to return text identified from the image, and then natural language processing and possibly natural language understanding in particular may be executed using the returned text to determine a context or topic from the text. The system may then determine whether the context or topic from the text relates to the same task that the other video conference participants are engaged in. For example, this might be used for situations where two screens are presenting markedly different content but both still relate to the same task, like where one student is viewing an online encyclopedia about cylinders while others are viewing graphical representations of cylinders as discussed above.

Additionally or alternatively, object recognition (another example type of computer vision) may be executed on the images to determine whether the one or more first images and the one or more second images show a same non-text graphical object as being presented on each of the first and second screens. The non-text graphical object might be a logo, a digital photograph, a 3D model, etc.

As yet another example, pattern matching and/or color matching algorithms may be executed (still other example types of computer vision) to determine whether the one or more first images and the one or more second images show a same color scheme presented on each of the first and second screens. A matching color scheme might therefore show the same colors in the same relative amounts for a given screen area, possibly in the same position with respect to other colors also presented on each screen. Note that here too a threshold level of confidence may be used to overcome what might otherwise be false positives due to layout differences, scroll position, scaling factors, etc.

As but one more example, feature extraction and/or boundary recognition may also be executed (additional example types of computer vision) to determine whether the one or more first images and the one or more second images show a same shape as being presented on each of the first and second screens. The same shape might relate to a non-text graphical object, a screen layout, a current shape of an active window, etc.

Other types of computer vision may also be used consistent with present principles and depending on implementation. For example, if a conference presenter is actively speaking to the other video conference participants, facial recognition might be executed on the images from each screen to determine whether each screen is currently showing the same presenter's face and hence that the respective participant is on task in terms of actively viewing the presenter themselves.

Further note that at block 620, other types of algorithms not necessarily tied to computer vision may also be executed to determine whether the one or more first images and the one or more second images indicate participant engagement in the same task. For example, topic analysis might be executed as described above to determine whether the participants are still learning about a same subject/topic (and hence are on the same task if the subject/topic for each is determined to be the same). This technique might also be particularly useful if the screen layouts or presented content is markedly different between the participant screens.

From block 620 the logic may then proceed to decision diamond 630. At decision diamond 630, the device may determine whether the one or more first images and the one or more second images indicate participant engagement in the same task (based on the execution of step 620). An affirmative determination at diamond 630 (engaged in the same task) may cause the logic to proceed block 640 where the device may decline to present any warning notifications (e.g., audible and/or visual).

However, a negative determination at diamond 630 may instead cause the logic to either proceed directly to block 670 as will be described in a moment or, alternatively, to proceed to block 650 first. At block 650 the device may set a flag for the relevant participant/screen that is determined to be off task, and also continue monitoring the flagged participant to determine if he/she is actually on task but is ahead or behind of other participants in engaging in the same task (e.g., monitor for the second threshold amount of time referenced above). Also at block 650, in some examples a notification like the notification 360 might be presented responsive to the first threshold amount of time described above elapsing.

In terms of being ahead or behind but still on task, note as an example that the task might involve answering test questions or group questions as presented over several electronic pages. So here, the ahead or behind participant's screen might show a different page of the same text/group questions but that participant is still on task. As another example, the task might involve reading through a slide presentation presented over several electronic slides, and so the ahead or behind participant's screen might show a different slide from the same slide deck that others are viewing and so that student is still on task.

From block 650 the logic may proceed to block 660 to determine whether additional respective images from each participant's screen indicate participant engagement in the same task (e.g., by continuing to execute the functions described above in reference to block 620). An affirmative determination at diamond 630 (engaged in the same task) may cause the logic to proceed block 640 again, where the device may decline to present any notifications and may also reset/remove any status flags that might have been set at block 650.

However, based on a determination that the additional respective images from each screen do not indicate participant engagement in the same task, the logic may instead proceed to block 670. At block 670 the device may present audible and/or visual notifications at the conference organizer's device (e.g., teacher's client device in the case of remote learning) and/or at the client device(s) of the participant(s) that are determined to be off task. The notifications might be established by, for example, the notifications 410, 420, 430, 440, 530, 540, and/or 550 as described above to thus indicate that the respective participant's screen images do not indicate participant engagement in the same task. Additionally or alternatively, an audible notification in the form of a chime or musical tone or melody may be presented at block 670 to signal to the organizer/presenter/teacher (and/or student themselves) in an unobtrusive manner that the student is off track and doing something unrelated to the subject or task at hand.

From block 670, the logic may then revert back to block 610, or to another step, and proceed again therefrom.

Figure 7:
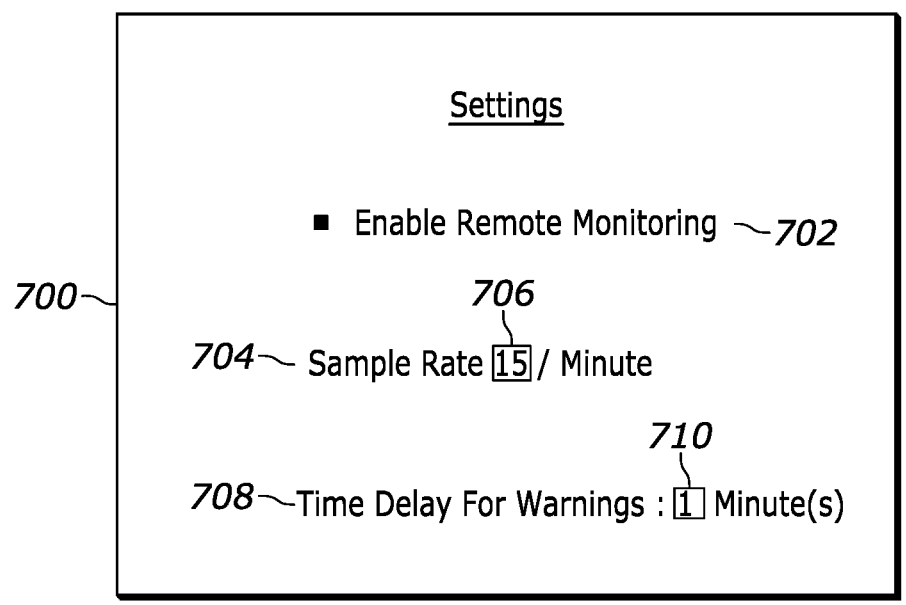
FIG. 7 shows an example settings GUI that may be presented on display to configure one or more settings of a system/device to operate consistent with present principles.

Before moving on to the description of FIG. 7, note the following with respect to determining whether a video conference participant is engaged in the same task as others even when their screen content is determined to be different (e.g., using respective screen images with respective timestamps for the same time of day). The system may cache respective images from each participant's screen (e.g., in RAM) going back a most-recent threshold amount of already-transpired conference time (and then delete the cached images from the buffer as they progressively expire). The system may also cache the computer vision results for each image for the same threshold amount of already-transpired conference time. Then if the participant is behind and their screen content therefore does not match that of others, before flagging this participant as being off task or presenting any notifications, the system may use the differing image of the behind student's screen to see if that differing image with a relatively later timestamp (of the current time of day at which the image was generated) matches a majority of other participants' screens but for images with timestamps from earlier times of day. If a match is returned using the images with different timestamps for different times of day, the behind participant may be determined to still be engaged in the same task, albeit not participating in the same aspect of the same task at the same time as others since he/she is behind.

Thus, a history of images from other participants may be parsed to look for matches to a recent image from another participant. If a match is returned using the history, the relevant participant may still be determined as on task. If a match is still not returned, the participant may be determined to be not on task and/or may be flagged as potentially ahead of other participants but still on task.

Thus, in one example, after determining that a content mismatch exists and that the user is not behind according to the foregoing, the system might still not flag the participant at first and may instead wait a third threshold amount of time (e.g., 30 seconds or even two minutes). At expiration of the third threshold amount of time, the system may again determine if the same unmatched image content from before (with a timestamp from a prior time) now matches image content from a majority or plurality of other participants even if the timestamps for the images of the other participants are different (later in time). If a task match is then made based on this process, the relevant participant may be determined to be on task even though he/she is ahead of others. But if a task match is still not made, the relevant participant may be flagged and even one of the audible/visual notifications 410, 420, 430, 440, 530, 540, and/or 550 presented.

Now in reference to FIG. 7, it shows an example GUI 700 that may be presented on the display of a client device and/or server to configure one or more settings of the device to undertake present principles. The GUI 700 may be presented based on a user navigating a device or video conferencing application ("app") menu, for example. Also note that each of the example options described below may be selected via touch, cursor, or other input directed to the associated check box per this example.

As shown in FIG. 7, the GUI 700 may include a first option 702 that may be selectable a single time to set/configure the device to, for multiple future video conferences, monitor the screens of remote conference participants and present notifications if one is off task consistent with present principles. Thus, selection of the option 702 may set or enable the device/conferencing system to undertake the actions described above in reference to FIGS. 3-5 as well as to execute the logic of FIG. 6.

As also shown in FIG. 7, the GUI 700 may include a setting 704 at which a sample rate may be specified. The sample rate may be a rate at which the conferencing system selects images from each screen live feed of each participant to analyze to determine if the respective participant is engaged in the same task as a plurality or majority of other participants consistent with present principles. Accordingly, the end-user may enter numerical input to input box 706 using a hard or soft keypad to specify a sample rate of a particular amount per minute (fifteen per minute in the present example).

FIG. 7 also shows that the GUI 700 may also include a setting 708 at which the user can set a time delay prior to presenting notifications to an off-task video conference participant. Thus, responsive to this threshold amount of time for the time delay ending, the notification(s) may be presented. This might be used, for example, to account for users who might be behind or ahead of the same task step that a majority of other conference participants might be engaged in but are still on the same overall task itself. Or this might be used to simply give users time to get back on task themselves. Regardless, per this example, numerical input may be directed to input box 710 to establish the time delay (e.g., one minute in this example).

Moving on from FIG. 7, note more generally that present principles may apply to other video conference implementations besides remote learning as well. For example, in addition to remote learning, present principles may be used for online competitions and online gaming. Other implementations are encompassed as well.

Also note consistent with present principles that in some examples, a video conferencing system may look for a progression of things happening on the organizer's screen. The system may follow steps laid out by the organizer (e.g., teacher) and compare the last X thumbnails (e.g., last thirty thumbnails) for each student, progressing along so see if the students are each on at least one of the steps already laid out by the organizer (even if not all concurrently on the same step) to determine that the students are still on task. If a given student's current screen shows none of the steps laid out on the presenter screen, that student may have been determined as an off-task student for which a notification should be presented.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   a processor assembly; and
   storage accessible to the processor assembly and comprising instructions executable by the processor assembly to:
   access one or more first images of a first screen of a first video conference participant;
   access one or more second images of a second screen of a second video conference participant;
   execute computer vision to analyze the one or more first images and the one or more second images to determine whether the one or more first images and the one or more second images indicate, to at least a threshold level of confidence, participant engagement in a same task;
   based on a determination that the one or more first images and the one or more second images do not indicate participant engagement in the same task, present a notification to one of the first and second video conference participants instructing the respective participant to whom the notification is presented on steps to take to get back on task;
   execute topic analysis to determine that the one or more first images and the one or more second images show different content that still relates to the same subject, the different content being different in that no portions of first content shown in the one or more first images are shown in the one or more second images and such that no portions of second content shown in the one or more second images are shown in the one or more first images; and
   responsive to determining that the one or more first images and the one or more second images show the different content that still relates to the same subject, decline to present the notification.

2. The first device of claim 1, wherein the instructions are executable to:
   determine the one or more steps to take for presentation as part of the notification.

3. The first device of claim 2, wherein the one or more steps to take are determined using one or more rules-based algorithms.

4. The first device of claim 2, wherein the one or more steps to take are determined using an artificial intelligence-based machine learning model.

5. The first device of claim 1, wherein the one or more steps to take comprise plural steps to take.

6. The first device of claim 1, wherein the instructions are executable to:
   present a graphical user interface (GUI) on a display, the GUI being different from the notification, the GUI comprising a first setting that is selectable a single time to set the first device to, for multiple future video conferences, track participant engagement in assigned tasks and present notifications to get back on task responsive to off-task determinations.

7. The first device of claim 1, wherein the different content comprises different pages of an electronic document.

8. The first device of claim 1, wherein the different content comprises different slides of a slide presentation.

9. The first device of claim 1, wherein the instructions are executable to:
   determine whether the one or more first images and the one or more second images indicate, to at least the threshold level of confidence, participant engagement in the same task by comparing the one or more first images to the one or more second images to determine whether the one or more first images match the one or more second images to at least within a predefined threshold.

10. The first device of claim 9, wherein the instructions are executable to:
    based on a determination that the one or more first images do not match the one or more second images to at least within the predefined threshold, present the notification.

11. A method, comprising:
    accessing one or more first images of a first screen of a first video conference participant;
    accessing one or more second images of a second screen of a second video conference participant;
    executing computer vision to analyze the one or more first images and the one or more second images to determine whether the one or more first images and the one or more second images indicate, to at least a threshold level of confidence, participant engagement in a same task;
    based on determining that the one or more first images and the one or more second images do not indicate participant engagement in the same task, presenting a notification to one of the first and second video conference participants instructing the respective participant to whom the notification is presented on steps to take to get back on task;
    executing topic analysis to determine that the one or more first images and the one or more second images show different content that still relates to the same subject, the different content being different in that no portions of first content shown in the one or more first images are shown in the one or more second images and such that no portions of second content shown in the one or more second images are shown in the one or more first images; and responsive to determining that the one or more first images and the one or more second images show the different content that still relates to the same subject, declining to present the notification.

12. The method of claim 11, comprising:
determining the one or more steps to take for presentation as part of the notification.

13. The method of claim 12, wherein the one or more steps to take are determined by executing an artificial intelligence-based machine learning model.

14. The method of claim 11, wherein the different content comprises different pages of an electronic document.

15. The method of claim 11, wherein the different content comprises different slides of a slide presentation.

16. The method of claim 11, comprising:
presenting a graphical user interface (GUI) on a display, the GUI being different from the notification, the GUI comprising a first setting that is selectable a single time to set a device to, for multiple future video conferences, track participant engagement in assigned tasks and present notifications to get back on task responsive to off-task determinations.

17. At least one computer readable storage medium (CRSM) that is not a transitory signal, the at least one CRSM comprising instructions executable by a processor assembly to:
execute computer vision to analyze the one or more first images and the one or more second images to determine whether the one or more first images and the one or more second images indicate, to at least a threshold level of confidence, participant engagement in a same task;
based on a determination that the one or more first images and the one or more second images do not indicate participant engagement in the same task, present a notification to one of the first and second video conference participants instructing the respective participant to whom the notification is presented on steps to take to get back on task;
execute topic analysis to determine that the one or more first images and the one or more second images show different content that still relates to the same subject, the different content being different in that no portions of first content shown in the one or more first images are shown in the one or more second images and such that no portions of second content shown in the one or more second images are shown in the one or more first images; and
responsive to determining that the one or more first images and the one or more second images show the different content that still relates to the same subject, decline to present the notification.

18. The at least one CRSM of claim 17, wherein the different content comprises different pages of an electronic document.

19. The at least one CRSM of claim 17, wherein the different content comprises different slides of a slide presentation.

20. The at least one CRSM of claim 17, wherein the instructions are executable to:
present a graphical user interface (GUI) on a display, the GUI being different from the notification, the GUI comprising a first setting that is selectable a single time to set the processor assembly to, for multiple future video conferences, track participant engagement in assigned tasks and present notifications to get back on task responsive to off-task determinations.

* * * * *